Feb. 9, 1965  R. DEFLANDRE  3,168,851
MULTI-COMBINATION MACHINES FOR MACHINING
WORKPIECES OF LARGE DIMENSION THAT HAVE
A GENERAL FORM OF REVOLUTION
Filed April 11, 1962  8 Sheets-Sheet 1

United States Patent Office 3,168,851
Patented Feb. 9, 1965

3,168,851
MULTI-COMBINATION MACHINES FOR MACHINING WORKPIECES OF LARGE DIMENSION THAT HAVE A GENERAL FORM OF REVOLUTION
René Deflandre, Paris, France, assignor to Société dite: Derefa, Etablissement pour le Developpement, Recherches et Fabrications Industrielles, Vaduz, Liechtenstein
Filed Apr. 11, 1962, Ser. No. 186,754
Claims priority, application France, Apr. 18, 1961, 859,033
16 Claims. (Cl. 90—11)

The present invention relates to multicombination machines for machining workpieces of large dimension that have a general form of revolution, and has for an object, improvements therein.

Workpieces having a general form of revolution, particularly cylindrical parts, employed in heavy industry, in particular for the equipment of high-power generating stations using thermonuclear energy, are becoming increasingly larger.

The machining of such workpieces on conventional machines, such as vertical lathes or milling and boring machines, which is even difficult in the case of parts of average dimensions, becomes practically impossible when they attain the increased dimensions required at the present time.

The difficulty increases further when the parts are in the form of a tank or vat of very large dimensions (several metres in diameter and height) because, in this case, it is impossible to resort to conventional machining methods consisting in rotating tool holders fixed to a plate or chuck, the workpiece being fixed to and concentric with the latter.

Moreover, the variety of machining operations demanded, apart from the ordinary turning operations such as duplicating of complex shapes, milling, boring, drilling or tapping, requires, with conventional machines, the transport of the workpiece to, and the adjustment thereof on, various machines or even the setting up of portable machines inside the workpiece, which operations cause loss of time and lack of precision of the work carried out.

It is therefore an object of the present invention to produce a machine which will allow workpieces of any dimensions whatsoever, to be machined, in particular in the form of a ring or preferably in the form of a tank or vat provided with a hole of small size in the bottom thereof.

The machining is carried out in a single working position, with the maximum power available on the machine, and thus in the shortest time and with the maximum precision.

According to the invention, a multicombination machine for machining workpieces of large dimensions, comprises a non-removable element constituted by a rotary plate on which the workpiece to be machined is mounted and which is adapted to perform rotary movements suitable for turning, circular milling or dividing operations, a removable machining unit constituted by a longitudinal member of large section on which at least one machining headstock can be moved for effecting said machining operations, said unit having means for fixing it to supports, and a series of supporting elements disposed at various locations in a base of foundation and adapted to be used at will for fitting up the removable machining unit.

The division operations permit the carrying out of milling, boring, drilling and tapping work at selected angles either in a single operation or by repetition.

The rotary plate may be carried by a hollow pivot itself carrying a supporting and centering piston adapted to be used for supporting one of the ends of the removable machining unit.

The longiudinal member of large section carrying the machining equipment may comprise two carriages adapted to be moved along said member on two rectangular faces thereof, one of these carriages being equipped with a headstock movable in a direcion at right angles to the movement of the carriage, said headstock comprising the machining (milling, boring or turning) tools and the other carriages serving as a support for tool-holding rests which themselves carry all the appropriate machining heads.

The movable machining unit may be placed in any position whatsoever in space. More frequently and for the uses which will be described hereinafter by way of example it will be used in vertical or horizontal positions, but if desired, it may be used in an angular, i.e. sloping position. The feed devices for the carriages, the headstock and the tool holders are provided with high-precision means for automatic stopping and with conventional means permitting shapes to be duplicated from a model or pattern.

A foundation or base structure adapted to the size of the parts to be machined and provided with various cast iron or concrete supports, permits the placing of the movable unit in the most suitable position with respect to the workpiece rotated by the plate.

In order that the invention may be more clearly understood, reference will now be made to the accompanying drawings which show one embodiment thereof by way of example only, and in which.

Figure 1:
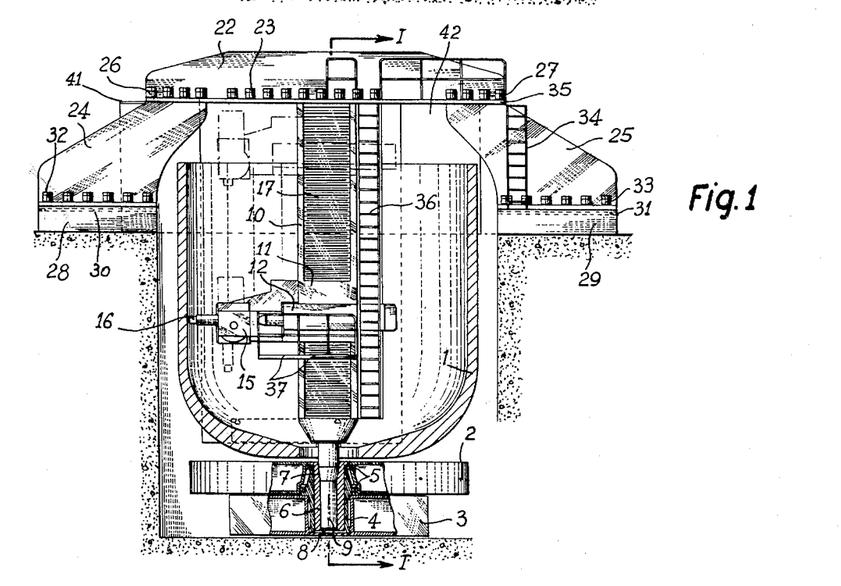
FIGURE 1 is an elevation, partly in section, of a machine according to the invention, effecting machining operations on the interior of a tank or vat of very large diameter.
Figure 2:
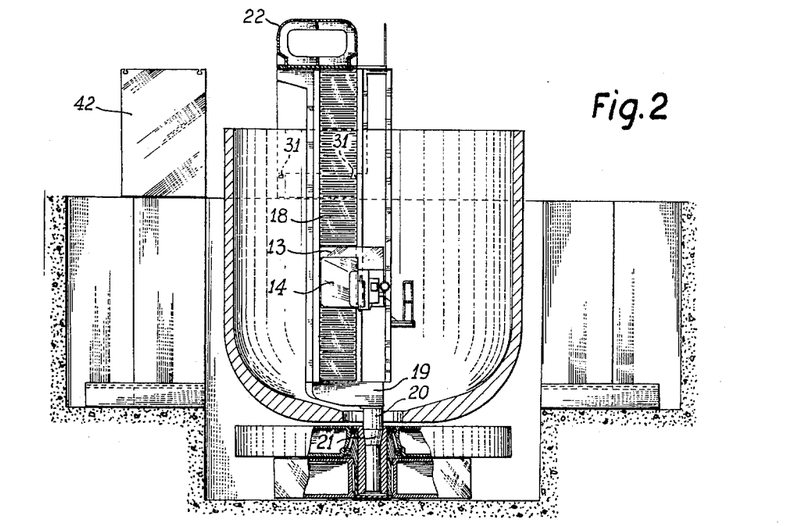
FIGURE 2 is a section on the line I—I of FIGURE 1.
Figure 3:
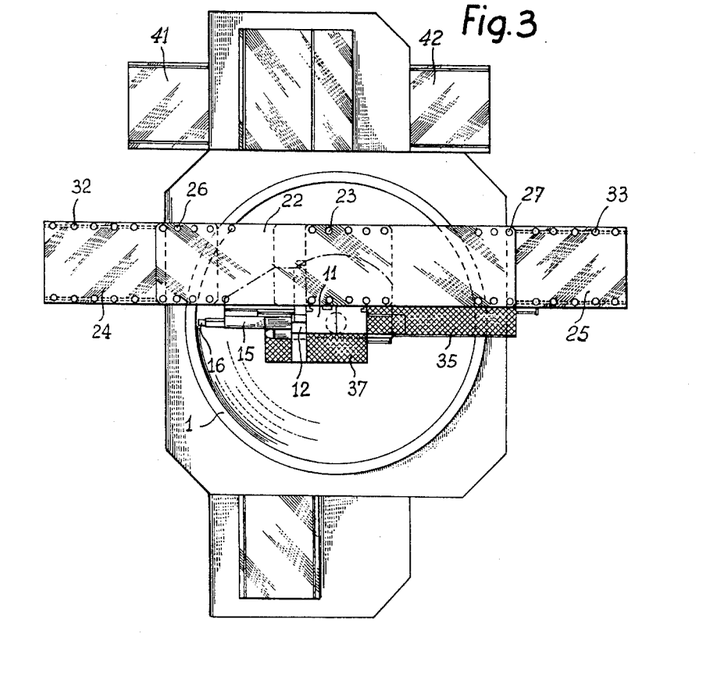
FIGURE 3 is a plan view of the machine shown in FIGURE 1.

Referring now to the drawings, FIGURES 1, 2 and 3, show the application of the invention to the internal machining of a workpiece 1 in the form of a tank or vat of large diameter and great height.

The tank is placed on a circular plate 2 which is arranged to be rotated in any convenient manner on a seat 3 around a pivot 4 provided with two bearings 5.

No drive means are shown for the plate 2 since that may take any form well known in the art, e.g. an electric motor. The pivot has an internal bore in which there is slidable with a very small play a piston 6 having, at its upper portion, a high precision tapered centering section 7.

The piston 6 receives oil under pressure below its bottom face 8. The oil inlet for the pivot 4 is connected to a geared pump (not shown) through a pressure regulating valve (also not shown) enabling the pressure below the face 8 to be regulated in such manner as to balance the weight of the parts described later on and bearing on the centering means 7. The pressure or thrust can be checked on a suitable pressure gauge (not shown).

This hydraulic supply arrangement provides a support of adjustable value which is capable of shifting along the axis 9.

A longitudinal member 10 which, for greater convenience, will be called the post (although it may occupy a horizontal position in some cases), carries a carriage 11 movable vertically thereon. The carriage 11 receives a headstock 12 movable longitudinally along the axis of the machining spindle.

The post 10 also carries a carriage 13 coupled to the carriage 11 and moving vertically with the latter.

A removable rest 14 is fixed to the carriage 13 and supports a pivoting tool holder 15 equipped with a movable slider 16 to which there are fixed turning tools or milling, drilling or boring heads.

The slides and feed screws for the carriages 11 and 13 are not shown in the drawings, but are covered by expanding protection means 17 and 18. Such slides and feed screws take, however, any of the conventional forms known in the art.

The post 10 is fixed to a base 19 to which there is bolted a pivot 20 of large section, the tapered end 21 of which is engaged and supported in the centering means 7 of the piston 6, under the conditions of equilibrium described above.

The post is centered and strongly secured at its top to a beam 22 by means of bolts 23.

The beam 22 rests at its two ends on frames 24 and 25 to which it is fixed by means of bolts 26 and 27.

The frames 24 and 25 are movable on beds 28 and 29 provided with T-shaped grooves 30 and 31. Fixing is effected by means of bolts 32 and 33 engaged in the T-shaped grooves and permits a longitudinal adjustment of the beam 22 and of the post 10. Ladders and foot bridges 34, 35, 36, 37 give access to the headstock 12 and to the tool holders 15.

Figure 4:
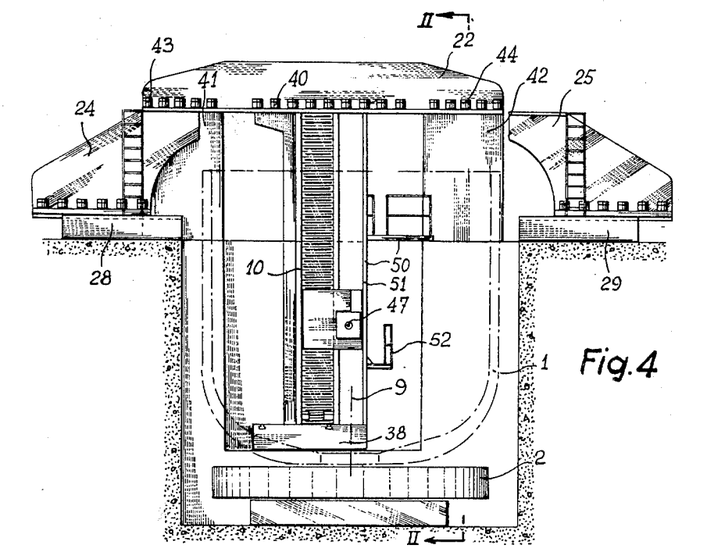
FIGURE 4 is an elevation, partly in section, of the machine working the outside of the tank or vat.
Figure 5:
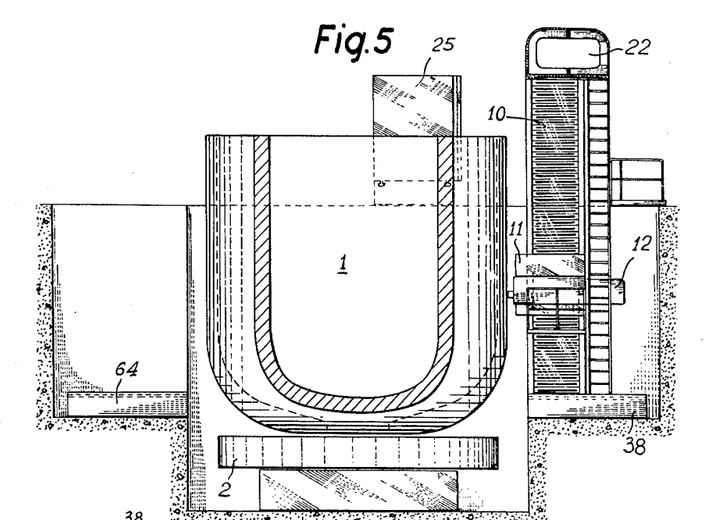
FIGURE 5 is a section on the line II—II of FIGURE 4.
Figure 6:
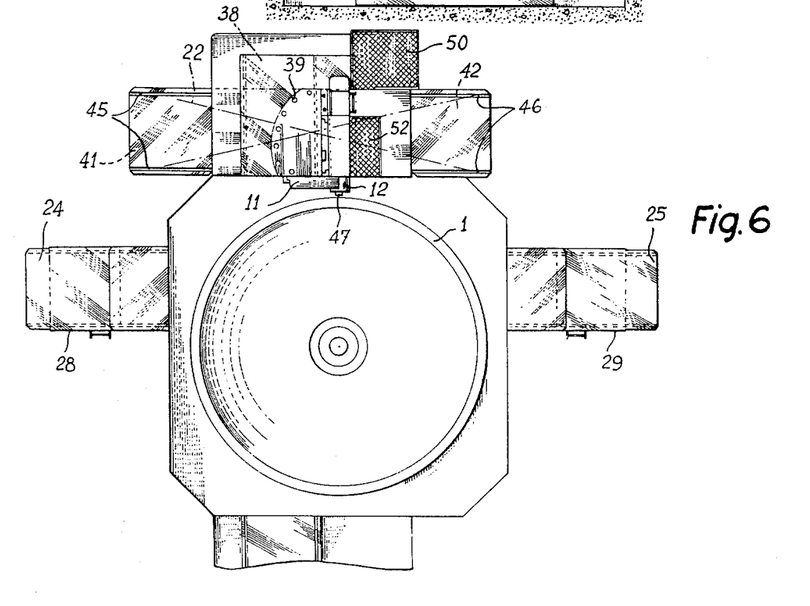
FIGURE 6 is a plan view of the machine shown in FIGURE 4.

FIGURES 4, 5 and 6 show the operation of external machining of the tank 1. The post 10, equipped this time only with the carriage 11 and the headstock 12 (the rest 14 having been removed), is fixed to a base 38 by means of bolts 39.

So as to support the very high post 10 in order to permit of obtaining the maximum precision, said post is fixed at the top to the beam 22, already used in the internal turning operation, by means of bolts 40. The beam 22 is itself rendered rigid with two frames 41 and 42 made of cast iron or reinforced concrete, by means of bolts 43 and 44 located in T-shaped grooves 45 and 46. This arrangement enables the axis of the spindle 47 to be placed in coincidence with, i.e. to cut, the extension of the axis 9 of the plate 2.

Foot bridges and ladders 50, 51, 52 give access to the headstock 12. It is to be noted that, in the drawings, the frames 25 and 24 have been retracted so as to facilitate handling and, if required, turning round of the workpiece 1.

Figure 7:
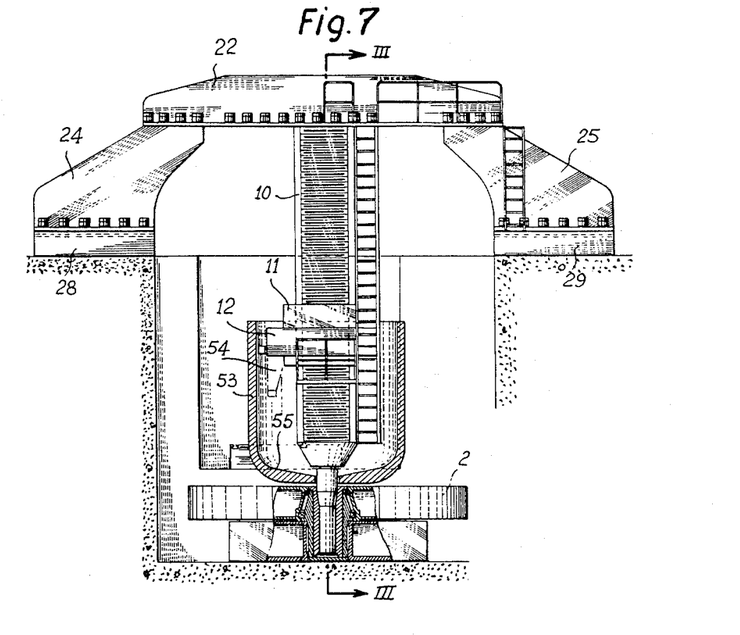
FIGURE 7 is an elevation, partly in section, of the machine working the interior of a tank of small diameter.
Figure 8:
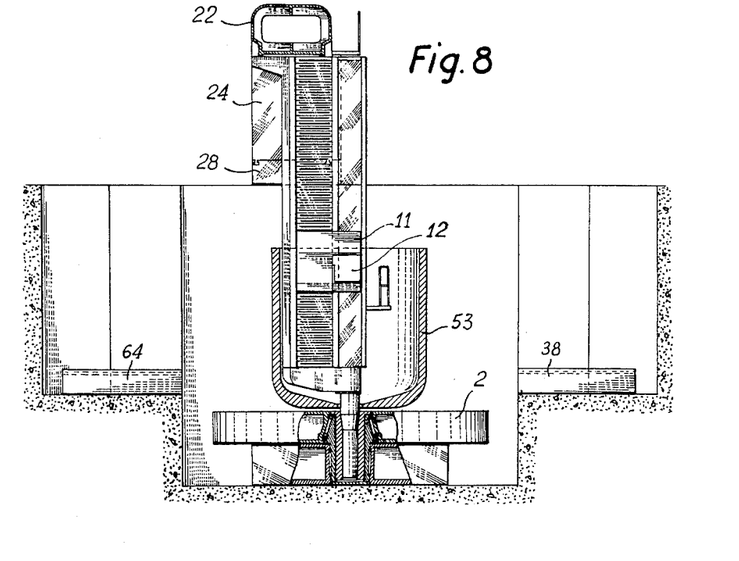
FIGURE 8 is a section on the line III—III of FIGURE 7.
Figure 9:
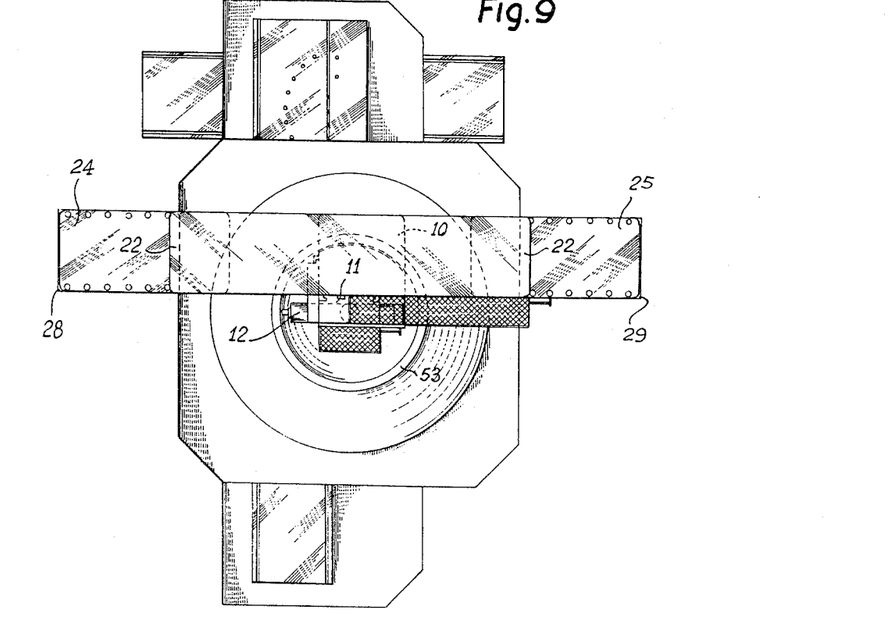
FIGURE 9 is a plan view of the arrangement shown in FIGURE 7.

FIGURES 7, 8, 9 show the same machine arrangement as FIGURES 1, 2, 3 but applied to the machining of a workpiece 53 of much smaller diameter. Taking account of the over-all dimensions of the post 10, use is made of the headstock 12 which may, if required, be equipped with offset tool holders 54 so as to permit the machining of the bottom profile 55.

Figure 10:
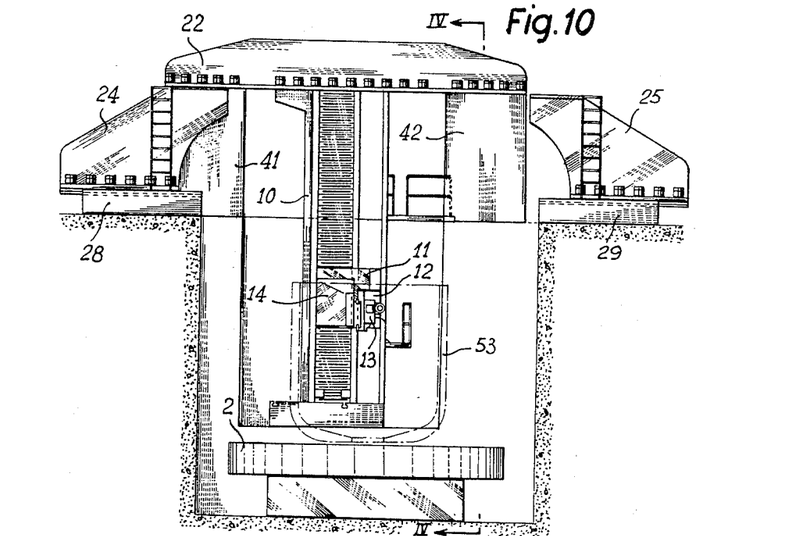
FIGURE 10 is an elevation, partly in section, of the machine working the outside of the small tank.
Figure 11:
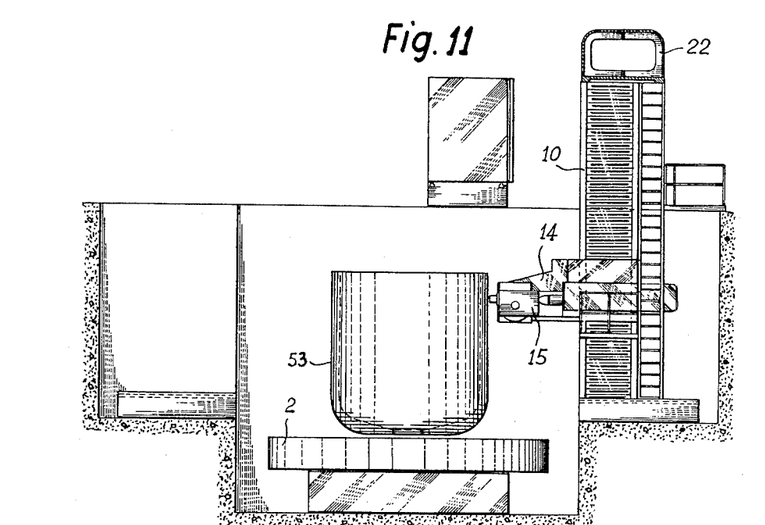
FIGURE 11 is a section on the line IV—IV of FIGURE 10.
Figure 12:
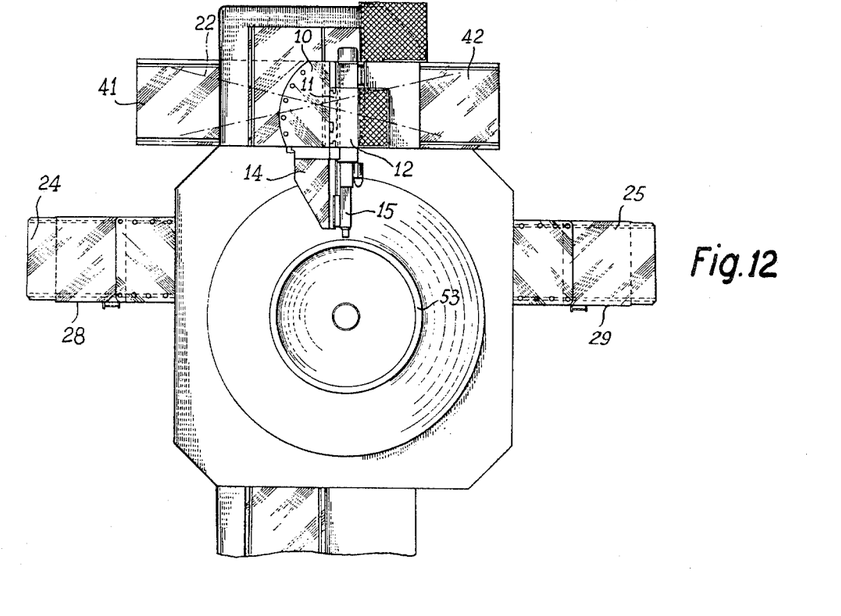
FIGURE 12 is a plan view of the arrangement shown in FIGURE 10.

FIGURES 10, 11, 12 show the same machine arrangement as FIGURES 4, 5, 6 applied to the external machining of the workpiece 53. Use is made of the rest 14 and of the tool holder 15.

Figure 13:
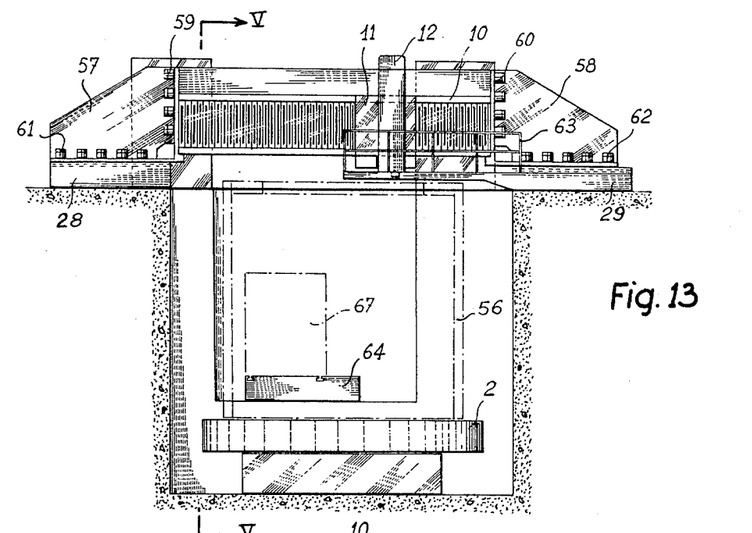
FIGURE 13 is an elevation of the machine working a ring of great height.
Figure 14:
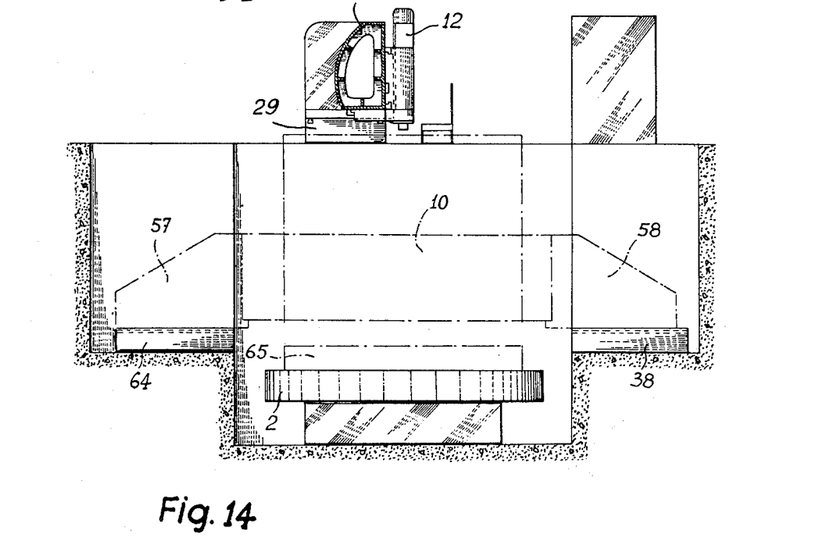
FIGURE 14 is a section on the line V—V of FIGURE 13, and also showing diagrammatically the arrangement adopted for machining a ring of small height.
Figures 15, 16:
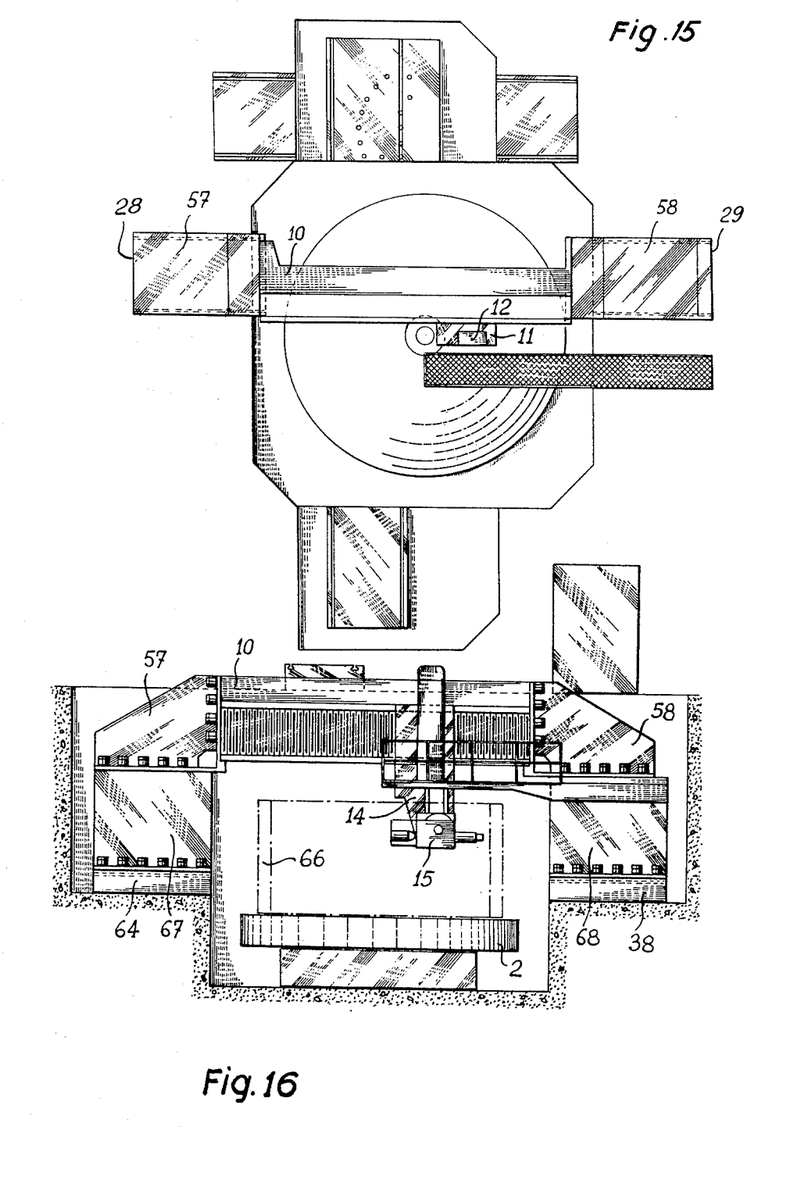
FIGURE 15 is a plan view of FIGURE 13.
FIGURE 16 is a section on the line V—V of FIGURE 13 showing the machining of a ring of average height.

FIGURES 13, 14 and 15 show another method of arranging machines, using the post 10, the carriage 11, and the headstock 12 for machining a part 56. The post 10 is fixed in a horizontal position against two frames 57 and 58 by means of bolts 59 and 60.

The frames 57 and 58 are movable longitudinally on the beds 28 and 29 already referred to.

The longitudinal movement of the frames 57 and 58 permits ready setting up and adjustment of the post 10. The fixing of the frames is effected by means of bolts 61 and 62 in the T-shaped grooves of the beds. A removable foot bridge 63 gives access to the headstock 12.

FIGURE 14 shows diagrammatically the low working position of the post 10 fixed to the same frames 57 and 58 resting on the bed 38 and another bed 64 identical with the latter. This arrangement permits the machining of a part 65 of large diameter and small height.

FIGURE 16 shows the machining of a part 66 of intermediate height. The post 10 and its frames 57 and 58 are fixed to the beds 38 and 64 by means of blocks 67 and 68 of cast iron or of reinforced concrete provided with cast iron bearing plates.

In this application, the rest 14 and the tool holder 15 are used.

Of course, in the event of the post 10 being disposed vertically inside the tank or other workpiece, and where the latter does not have a hole in its bottom portion, the post 10, instead of resting on the piston 6 mounted in the pivot 4 of the circular plate 2, rests on the bottom of the tank by means of centering bearings (not shown) mounted at the bottom of the tank 1.

It will be seen from the foregoing that the machine forming the subject-matter of the invention enables a very large number of operations to be carried out on parts of large dimensions without having to move it, whereby considerable saving of time is achieved in handling and a greater precision of the machining operations is obtained. It will also be seen that, owing to the large number of transformations possible on the machine, by reason of the removable machining unit and of the variety of its supports, it is possible to carry out extremely varied machining operations on parts of large, but very varied, dimensions.

I claim:

1. A multi-combination machine for machining workpieces of large dimensions, comprising a non-removable rotary plate for rotatably supporting the workpiece, a removable machining unit constituted by a longitudinal member of large section, means for mounting at least one machining headstock on said longitudinal member for effecting machining operations, support means, a base or foundation for said machine, comprising means for securing said maching unit to said support means, a plurality of supporting elements mounted in spaced relation on said base or foundation outside the area occupied by said rotary plate and spaced exteriorly from a workpiece supported on said rotatable plate, and means for selectively connecting said support means to said supporting elements to support said removable machining unit in one of a given number of positions relative to said rotary plate.

2. A multi-combination machine for machining workpiece of large dimensions, comprising a non-removable rotary plate, means for mounting the workpiece on said plate for rotation of the workpiece, a removable machining unit constituted by a longitudinal member of large section, means for mounting at least one machining headstock on said longitudinal member for effecting machining operations, a hollow pivot carrying said rotary plate, a supporting and centering piston carried by said hollow pivot for supporting one of the ends of said removable machining unit, a base or foundation for said machine, a plurality of supporting elements disposed at various locations on said base or foundation, and means for fitting said machining unit to said supporting elements in a desired position.

3. A multi-combination machine for machining workpieces of large dimensions, comprising a non-removable rotary plate, means for mounting the workpiece on said plate for rotation of the workpiece, a removable machining unit constituted by a longitudinal member of large section, means for mounting at least one machining headstock on said longitudinal member for effecting machining operations, a hollow pivot carrying said rotary plate, a supporting and centering piston carried by said hollow pivot for supporting one of the ends of said removable machining unit, means for supporting said piston by its bottom face by hydraulic pressure for balancing the elements supported by said piston, a base or foundation for said machine and a plurality of supporting elements disposed at various locations on said base or foundation, and means for fitting said machining unit to said supporting elements in a desired position.

4. A multi-combination machine for machining workpieces of large dimensions, comprising a non-removable rotary plate, means for mounting the workpiece on said plate for rotation of the workpiece, a removable machining unit constituted by a longitudinal member of large section, means for mounting at least one machining headstock on said longitudinal member for effecting machining operations, a hollow pivot carrying said rotary plate, a supporting and centering piston carried by said hollow pivot for supporting one of the ends of said removable machining unit, means for supporting said piston by its bottom face by hydraulic pressure for balancing the elements supported by said piston, a transverse beam, means for securing the other end of said removable machining unit to said transverse beam, a base or foundation for said machine, and a plurality of supporitng elements disposed at various locations on said base or foundation, and means for fitting said transverse beam to said supporting elements in a desired position.

5. A multi-combination machine for machining workpieces of large dimensions, comprising a non-removable rotary plate, means for mounting the workpiece on said plate for rotation of the workpiece, a removable machining unit constituted by a longitudinal member of large section, means for mounting at least one machining headstock on said longitudinal member for effecting machining operations, a transverse beam, means for securing one of the ends of said removable machining unit to said transverse beam, means for supporting the other end of said machining unit by a supporting member disposed outside said rotary plate, a foundation for said machine and means for mounting said transverse beam on supporting elements provided on said foundation.

6. Machine as defined in claim 1 and wherein two supporting elements are located at the upper part of said foundation, the axis of said supporting elements passing above said rotary plate, said elements comprising further supporting beds and means for carrying said elements on said beds for sliding movement therealong.

7. Machine as defined in claim 6 and comprising two further supporting elements on said foundation for carrying said support means, and means for fixing and disposing said further elements in a zone outside said rotary plate.

8. A multi-combination machine for machining workpieces of large dimensions, comprising a non-removable rotary plate, means for mounting the workpiece on said plate for rotation of the workpiece, a removable machining unit constituted by a longitudinal member of large section, support means, means for securing said machining unit to said support means, a base or foundation for said machine, a plurality of supporting elements disposed at various locations in said base or foundation, means for fitting said machining unit to said supporting elements in a desired position and two carriages mounted to be moved along said longitudinal member on two rectangular faces thereof, a headstock on one of said carriages and movable in a direction at right angles to the direction of movement of said carriage, and tool holding rests carried by said other carriage, said tool holding rests carrying all the appropriate machining heads.

9. A multi-combination machine for machining workpieces of large dimensions, comprising a rotatable horizontal plate for rotatably supporting the workpiece, a machining unit constituted of an elongated supporting member, headstock supporting means mounted on said member for movement longitudinally thereof, and a headstock for effecting machining operations carried by said supporting means, and means for supporting said machining unit in proper relation for effecting a machining operation on a workpiece supported on said rotatable plate, said supporting means including a foundation for the machine, a plurality of spaced beds mounted on said foundation outside the area occupied by said rotatable plate and spaced exteriorly from a workpiece supported on said rotatable plate, a plurality of supporting elements mounted on said beds, first means for selectively connecting said supporting elements to said beds, and second means for selectively connecting said supporting elements to at least one end of said elongated member.

10. A machine such as defined in claim 9, in which said second selective connecting means selectively connects said supporting elements to both ends of said elongated member.

11. A machine such as defined in claim 9, in which said second selective connecting means comprises a supporting beam mounted on and bridging the space between said supporting elements, and means connecting one end of said elongated member to said beam.

12. A machine such as defined in claim 9, in which said elongated member is vertically disposed, in which said second selective connecting means is connected to the upper end of said elongated member, and in which said supporting means additionally includes adjustable means connected to the lower end of said elongated member and supporting the same.

13. A machine such as defined in claim 9, in which said beds are mounted on said foundation at levels above the supporting surface of said rotatable plate, and said supporting elements are disposed wholly above said rotatable plate and support said supporting element so that said headstock supporting means is positioned higher than such plate surface throughout the range of movement thereof on said supporting element.

14. A machine such as defined in claim 9, in which said supporting elements comprise support blocks selectively connected by said first means to said beds, and frame members mounted on and secured to said blocks and selectively connected by said second means to at least one end of said elongated member.

15. A multi-combination machine for machining workpieces of large dimensions, comprising a rotary workpiece-carrying plate, a removable machining unit constituted of an elongated supporting member, and a tool-carrying headstock slidably mounted on said elongated supporting member, a foundation forming a pit, means rotatably supporting said workpiece-carrying plate at the bottom of said pit, a plurality of supporting elements mounted on said foundation and being located in spaced relation outside the area of said pit containing said plate and adjacent to the peripheral boundary of such area of said pit, and support means carried by said supporting elements and carrying said machining unit.

16. A multi-combination machine for machining workpieces of large dimensions, comprising a foundation constructed and arranged to constitute the main part of the machine and including a large pit, a rotary workpiece-carrying plate at the bottom of said pit, means at the bottom of said pit for rotatably supporting said plate for machining operations on the workpiece carried thereby, an elongated beam, means for supporting said beam on said foundation in or over said pit, a headstock slidably mounted on said beam, and a machining tool carried by said headstock.

References Cited by the Examiner
UNITED STATES PATENTS

| | | |
|---|---|---|
| 142,912 | 9/73 | Hill. |
| 693,015 | 2/02 | Hess. |
| 738,471 | 9/03 | Nardin. |
| 873,787 | 12/07 | Riddell. |
| 1,350,840 | 8/20 | Robbins. |
| 1,899,124 | 2/33 | Vogler _________________ 77—4 |
| 2,824,499 | 2/58 | Gambin et al. ___________ 90—11 |
| 3,057,234 | 10/62 | Heer. |

FOREIGN PATENTS 455,041   1/28   Germany.

WILLIAM W. DYER, Jr., *Primary Examiner.*